United States Patent

Crates et al.

[11] 4,329,078
[45] May 11, 1982

[54] SPLICE JOINT LOCK

[75] Inventors: Thomas B. Crates; James M. Crates, both of Charlotte, N.C.

[73] Assignee: Jameson Corporation, Charlotte, N.C.

[21] Appl. No.: 126,342

[22] Filed: Mar. 3, 1980

[51] Int. Cl.³ .............................................. F16B 7/10
[52] U.S. Cl. .................................. 403/316; 403/329; 285/314
[58] Field of Search .............. 403/329, 108, 316, 317, 403/324, 330, 328, 315; 285/319, 7, 315, 314; 248/408

[56] References Cited

U.S. PATENT DOCUMENTS

| | | | |
|---|---|---|---|
| 31,103 | 1/1861 | Barnard | 285/314 X |
| 1,237,935 | 8/1917 | May | 403/329 X |
| 1,966,718 | 7/1934 | Hanson | 285/314 X |
| 2,266,643 | 12/1941 | Kruse | 403/329 |
| 2,363,520 | 11/1944 | Fish | 403/108 |
| 3,244,437 | 4/1966 | Belicka et al. | 285/7 |

Primary Examiner—Andrew V. Kundrat
Attorney, Agent, or Firm—W. Thad Adams, III

[57] ABSTRACT

The invention relates to a lock for a splice joint used to releasably join two poles together end to end. The lock prevents the inadvertent withdrawal of the leaf spring finger from the superimposed holes of the splice joint. The lock comprises a ring rotatably positioned on one of the poles astride the leaf spring and having an inner surface comprised of a first, relatively large diameter segment which, when rotated into radial alignment with the leaf spring, permits withdrawal and a second, relatively smaller diameter segment which, when rotated into radial alignment with the leaf spring, frictionally engages and clamps the leaf spring to the pole and prevents withdrawal of the leaf spring finger.

13 Claims, 7 Drawing Figures

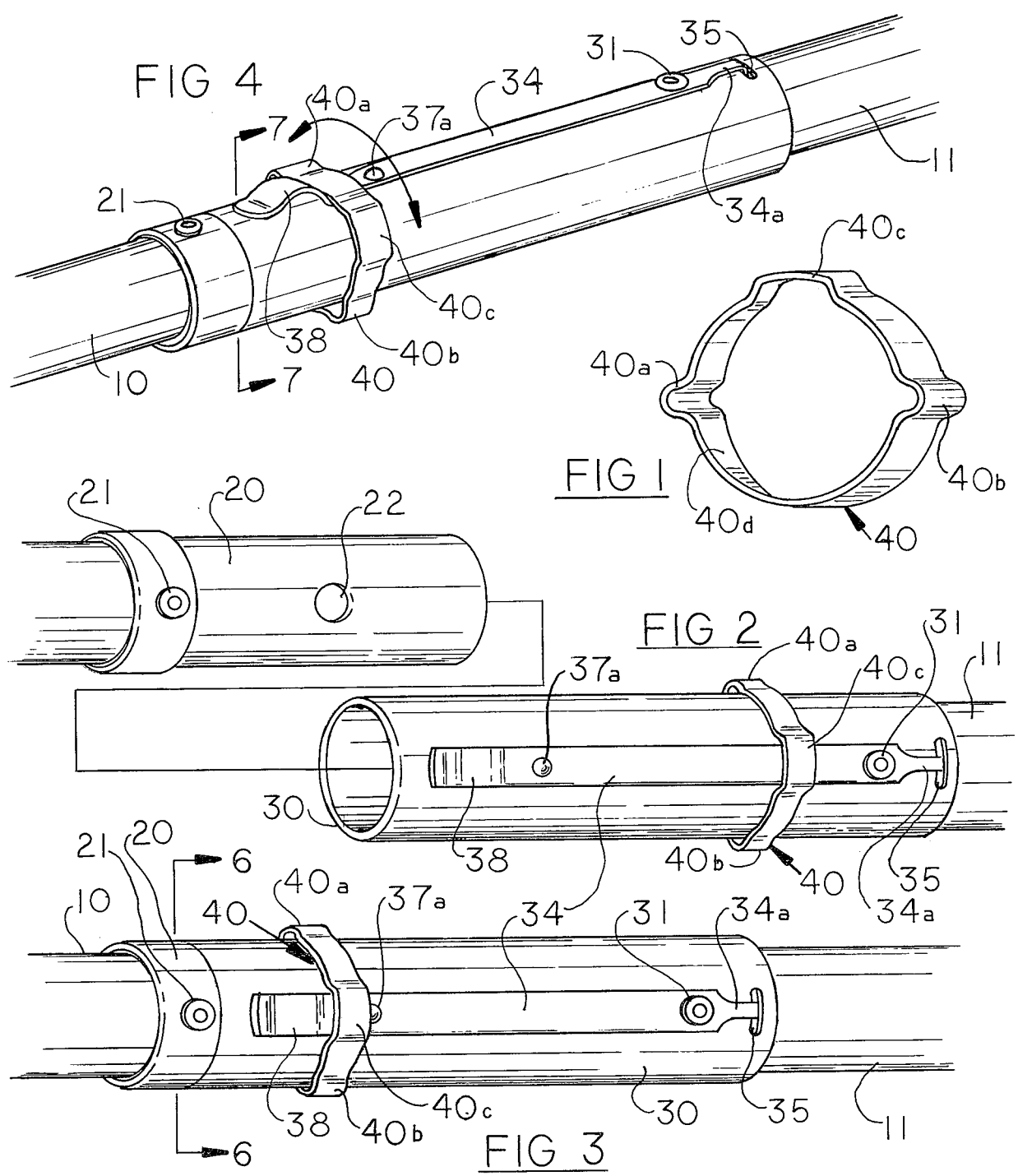

SPLICE JOINT LOCK

BACKGROUND OF THE INVENTION

This invention relates generally to splice joints used to interconnect relatively short lengths of pole together end to end to form a longer pole. These poles, with a wire raiser, cable lifter or similar accessory attached to one end, are used by telephone and electric power utilities, contractors and CATV companies to perform maintenance on wires and transmitting equipment atop utility poles. This same type of pole with a pruning or saw head on one end is used by utilities and arborists to trim high limbs and branches from trees.

Since these poles frequently come into contact with wires carrying electric current, the pole itself is manufactured of a nonconductive material such as wood or fiberglass. In order to facilitate storage and transport of these poles from one place to another, they are manufactured in relatively short lengths—for example 3 feet or 6 feet—and then connected together when desired by a splice joint.

One type of splice used to connect pole sections together end to end is the slip-joint splice. This type of joint generally comprises interlocking male and female portions secured to opposite ends of each pole. When the male end portion is properly received in the female end portion, a through hole in a radial wall of one of the end portions is superimposed with a through hole in the radial wall of the other. An axially extending leaf, or flat, spring is secured to the outer surface of one of the poles and has an inwardly extending finger, or button, which is positioned under spring tension in the superimposed holes. In this manner, each pole is prevented from moving either away from, or twisting relative to, the other.

To disconnect the two poles, the finger is withdrawn from the aligned holes by moving the leaf spring away from the surface of the pole.

Because of the simple construction and light weight of the slip-joint splice, it is one of the most common means of joining pole sections together. Nevertheless, the slip-joint splice suffers from one substantial and long recognized disadvantage. Because the two pole sections are held together solely by the leaf spring finger extending through the superimposed holes, much of the tensile, compressive, and twisting force exerted on the splice is absorbed by the finger. Heavy duty use of the poles causes the finger to "wallow" within the superimposed holes, gradually enlarging them. When in this condition, excessive tensile or twisting force on the splice can force the finger from the holes, disconnecting the splice. For this reason, slip-joint splices have traditionally been used only where they are not subjected to excessive tensile or compressive loads. Other types of splices are customarily used under these heavy duty conditions and in general, are heavier, more expensive and difficult to connect and disconnect than the slip-joint splice.

So far as is known, no simple and inexpensive device has heretofore been devised which can lock a slip-joint splice against inadvertent disconnection, while being quickly and easily manipulated to permit disconnection when desired.

SUMMARY OF THE INVENTION

Accordingly, it is an object of this invention to provide a lock for a splice joint which is inexpensive and easy to use.

It is a further object of this invention to provide a lock for a splice joint which can be quickly and easily manipulated solely by feel and while wearing heavy gloves.

It is still another object of this invention to provide a lock for a splice joint which enables the splice joint to be utilized under heavy load conditions, while safely maintaining the splice in its connected position.

These and other objects and advantages of the present invention are achieved in the preferred embodiment set forth below by providing a lock for a splice joint of the type utilized for releasably joining two poles together end to end. One of the poles has an end portion of a reduced diameter for being matingly positioned in a tubular end portion of the other pole. Both poles have a through hole in a radial wall of their respective end portions for being positioned in superimposed relation with each other. An axially extending leaf spring is secured to the outer surface of one of the poles and has an inwardly extending finger toward the free end thereof for being positioned under spring tension in the superimposed holes.

The lock itself comprises an arcuate clamp member rotatably positioned on one of the poles astride the leaf spring. The arcuate clamp member has an inner surface comprised of a first, relatively large diameter segment, which, when rotated into radial alignment with the leaf spring, permits withdrawal of the finger from the superimposed hole. The arcuate clamp member also comprises a second, relatively smaller diameter segment which, when rotated into radial alignment with the leaf spring, frictionally engages and clamps the leaf spring to the pole and prevents withdrawal of the finger from the superimposed holes. Preferably, the arcuate clamp member comprises a closed ring for encircling one of the poles and the leaf spring positioned thereon, and includes gripping means positioned on its outer surface for aiding in its rotation by hand.

According to a preferred embodiment of the invention, the gripping means comprise two diametrically opposed, outwardly projecting ear-like members. Also, according to the preferred embodiment of the invention, the relatively large diameter segment of the arcuate clamp member is integrally formed therein and has substantially the same radial width as the leaf spring. The arcuate clamp member is adapted to slide freely along the longitudinal extent of the leaf spring when the relatively large diameter segment of its inner surface is radially aligned with the leaf spring.

BRIEF DESCRIPTION OF THE DRAWINGS

Some of the objects and advantages of the invention have been set forth above. Other objects and advantages will appear as the description of the invention proceeds, when taken in conjunction with the following drawings, in which:

FIG. 1 is a perspective view of a preferred embodiment of the arcuate clamp member, comprising a ring, according to the present invention;

FIG. 2 is a perspective view of the male and female end portions, respectively, of a splice joint in disconnected position, and showing the lock positioned astride the leaf spring on the female end portion and in retracted position;

FIG. 3 is a perspective view of a splice joint showing the male end portion matingly received in the female end portion and showing the ring in unlocked position astride the leaf spring;

FIG. 4 is a perspective view of the splice joint showing the joint ring in locked position;

DESCRIPTION OF THE PREFERRED EMBODIMENT

Figure 6:
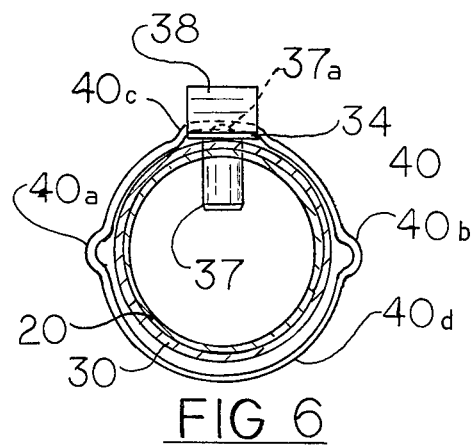
FIG. 6 is a cross-sectional view of the splice joint taken substantially along line 6—6 of FIG. 3; and, FIG. 7 is a cross-sectional view taken substantially along line 7—7 of FIG. 4.

Referring now more specifically to the drawings, a splice joint lock according to a preferred embodiment of the invention is shown. As is shown in FIG. 2, two poles, 10 and 11, are in position to be releasably joined together end to end. Poles 10 and 11 are each comprised of any suitable material, such as wood or fiberglass. Pole 10 has a male end portion 20 with a reduced diameter for being matingly positioned in a female, tubular end portion 30 secured to the end of pole 11. Male end portion 20 is secured by means of a stud or rivet 21 to the end of pole 10. As is also shown in FIG. 2, a through hole 22 is formed in and defined by the radial walls of end portion 20.

The female end portion 30 is likewise secured to the end of pole 11 by means of a stud or rivet 31. A leaf spring 34 is secured by rivet 31 to the female end portion 30 and extends axially along its outer surface. One end of the leaf spring 34 comprises a narrow tail 34a having a curved free end. This free end is positioned in a laterally extending slot 35 and thereby substantially prevents the rotation of the leaf spring 34 around a point defined by the rivet 31.

Figure 5:
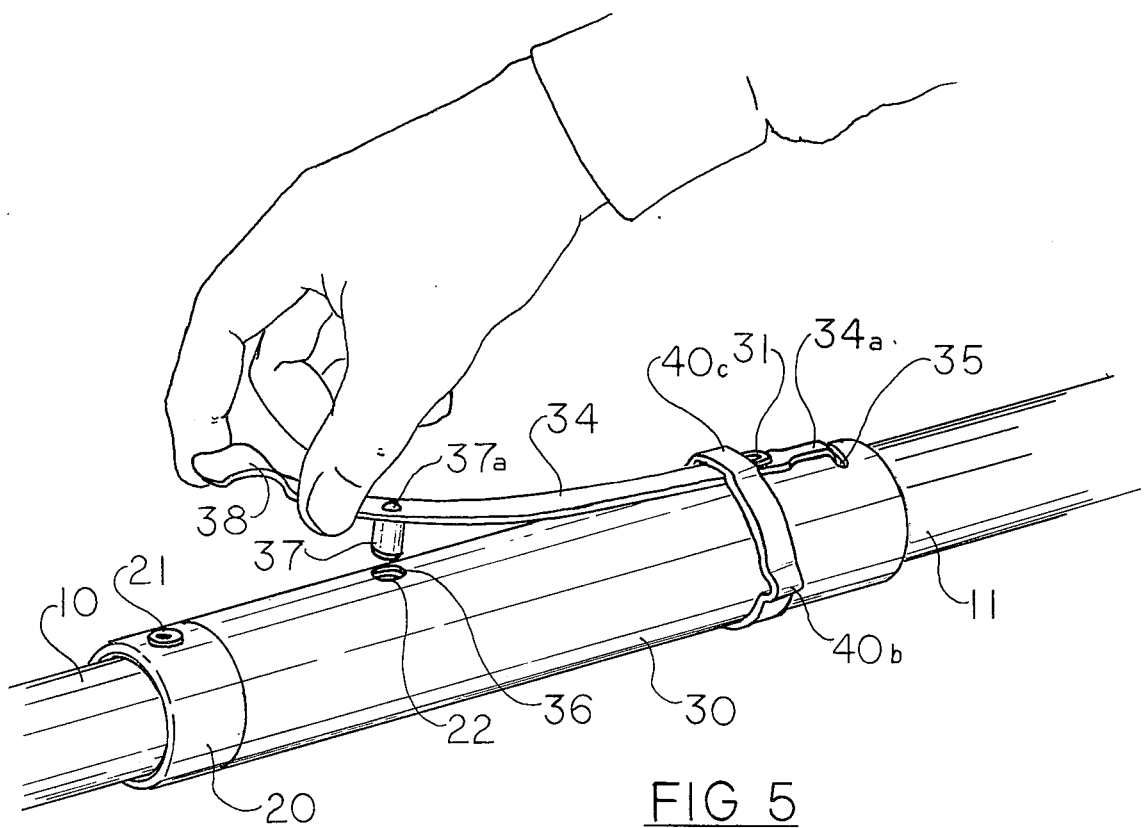
FIG. 5 is a perspective view of the splice joint according to FIG. 4 showing the ring unlocked and in retracted position.

As is shown in FIG. 5, a through hole 36 is formed in and defined by the walls of the female end portion 30. A downwardly extending finger 37 is secured to the underside of the leaf spring by means of a button head rivet 37a. The finger 37 is secured to the leaf spring 34 so as to be normally positioned in the through hole 36. As is also shown in FIG. 5, leaf spring 34 includes an integrally formed finger grip 38 which sits in raised position above the surface of the female end potion 30 so that it can be grasped between the thumb and forefinger and lifted, thereby removing finger 37 from superimposed holes 36 and 22.

When the male end portion 20 is fully received within the female end portion 30, through holes 22 and 36 are axially aligned. By twistin the male and female end portions 20 and 30, respectively, relative to each other radial alignment as well is achieved between holes 22 and 36. When this alignment occurs, stud 37 under the urging of the leaf spring 34 extends through and substantially beyond the aligned through holes 22 and 36, thereby joining poles 10 and 11 together. To release the splice joint, the stud 37 is withdrawn from the aligned through holes 22 and 36 by grasping the finger grip 38 and pulling upwardly.

The general structure of the slip-joint splice, as described above, is old and well known in the art. Splice joints of this general type have been used in the power and utility industry for many years. However, as explained above, the use of such splice joints has been avoided where the splices are potentially subjected to severe tensile or compressive loads. Such loads have been known in the past to cause disconnection of the splice as a result of the forced ejection of the finger 37 from the superimposed holes 22 and 36.

Therefore, in accordance with the present invention locking means are provided for preventing inadvertent withdrawal of the finger 37 from the superimposed holes 22 and 36. The locking means comprises an arcuate clamp member, preferably in the form of a closed ring shown at broad reference numeral 40, rotatably positioned on the female end portion 30 of pole 11 astride the leaf spring 34. The ring 40 is preferably formed from a galvanized steel hose clamp manufactured by Oetiker, Inc. of Livingston, N.J. For example, a ring $\frac{3}{8}''$ wide and having an internal diameter of approximately $1\frac{3}{4}''$ is suitable for use on a splice joint having an outside diameter of $1\frac{1}{2}''$.

In its original form as a hose clamp, the ring 40 is provided with two diametrically opposed, protruding segments. By use of a special tool, these segments are crimped together after placement of the hose clamp on the hose, thereby reducing the diameter of the clamp sufficiently to tightly encircle and grip the hose.

In accordance with the present invention, these segments are crimped and thereby form two diametrically opposed, outwardly projecting ear-like members 40a and 40b, and function as gripping means for aiding in hand rotation of the ring 40 as shown in FIG. 1. Also integrally formed in the ring 40 between the ear-like members 40a and 40b is a large diameter segment 40c. This large diameter segment 40c is formed by diestamping and serves as a guide to permit the ring 40 to freely slide along the longitudinal extent of the leaf spring 34 when the large diameter segment 40c is in radial alignment therewith. The circumference of the ring 40, with the exception of the relatively large diameter segment 40c, defines a second, relatively smaller diameter segment 40d. The size of ring 40 may be adjusted by stretching on a punch press.

As is shown in FIG. 2, when the ring 40 is positioned astride the leaf spring 34 adjacent the rivet 31, the two poles 10 and 11 may be releasably joined together by inserting the male end portion 20 into the female end portion 30 while the finger 37 is held in withdrawn position from hole 36. When holes 36 and 22 are aligned both radially and axially, the leaf spring 34 is released and the finger 37 is then positioned in the superimposed holes 22 and 36. In order to lock the finger 37 in the superimposed holes 22 and 36, ring 40 is positioned on the leaf spring 34 intermediate finger grip 38 and the head 37a of finger 37. While in this position, ring 40 is twisted either clockwise or counterclockwise (according to preference) thereby misaligning the relatively large diameter segment 40c and the leaf spring 34. This misalignment has the effect of reducing the diameter of the ring 40 relative to the splice joint, thereby clamping the leaf spring 34 firmly against the outer surface of the female end portion 30. As is best shown in FIG. 4, the raised head 37a of finger 37 prevents ring 40 from being retracted while locked from its position directly adjacent the finger grip 38.

Figure 7:
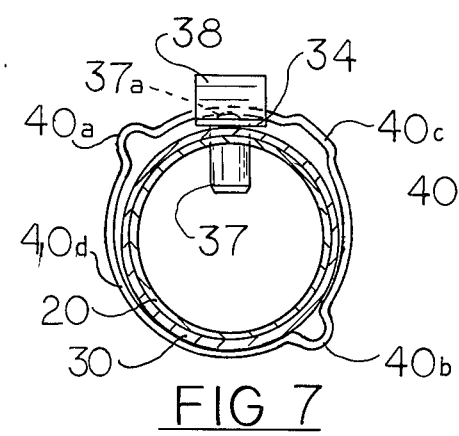

The effect of this radial misalignment on the outside diameter of the female end portion end 30 relative to the inside diameter of the ring 40 is illustrated and compared in FIGS. 6 and 7. As is shown in FIG. 6, when the relatively large diameter segment 40c is positioned in radial alignment with the leaf spring 34, a clearance of approximately ⅛" exists between the outer surface of female end portion 30 and the inner surface of ring 40. This clearance enables the ring 40 to easily slide along the longitudinal extent of the leaf spring 34 and to clear the raised head 37a of the finger 37.

In contrast, FIG. 7 shows that when the ring 40 is rotated sufficiently to radially misalign the relatively large diameter segment 40c and the leaf spring 34, this clearance no longer exists. As a result, the leaf spring 34 is tightly clamped to the outer surface of the female end portion 30. This clamping effect effectively prevents inadvertent withdrawal of the leaf spring finger 37 even under extreme tensile or compressive forces.

Since ring 40, while in locked position, will not move over the raised head 37a of finger 37, sliding of the ring 40 along leaf spring 34 is prevented and the possibility of inadvertent withdrawal of finger 37 eliminated. In addition, even if the large diameter segment 40c should be inadvertently rotated back into alignment with the leaf spring 34, finger 37 is still locked within superimposed holes 22 and 36 so long as ring 40 is not permitted to slide further than approximately one half the distance from finger grip 38 to rivet 31.

The ring 40 is prevented from sliding off the female end portion 30 by the finger grip 38 on one end of the leaf spring 34 and on the opposite end by a rivet with an enlarged heat (not shown) positioned on the outer surface of female end portion 30 in diametrical opposition to the rivet 31.

To disconnect the splice joint, the ring 40 is twisted until the large diameter segment is realigned with the leaf spring 34. The ring 40 is then free to slide back to rivet 31. With ring 40 thus retracted, the leaf spring 34 may be grasped at the finger grip 38 and pulled away from the surface of the female end portion 30, removing finger 37 from aligned through holes 36 and 22. This step is illustrated in FIG. 5.

Described above is a preferred embodiment of a lock for a splice joint which is inexpensive, easy to operate and maintenance-free. Various details of the invention as described above may be changed without departing from the scope of the invention. Furthermore, the foregoing description is for the purpose of illustration only and not for the purpose of limitation—the invention being defined by the claims.

We claim:

1. In a splice joint for releasably joining two poles together end to end, one of the poles having an end portion of a reduced diameter for being matingly positioned in a tubular end portion of the other pole, both poles having a through hole in a radial wall of their respective end portions for being positioned in superimposed relation with each other, and an axially extending leaf spring secured to the outer surface of the end portion of one of the poles and having an inwardly extending finger toward the free end thereof for being positioned under spring tension in the superimposed holes; the combination therewith of locking means for preventing inadvertent withdrawal of the finger from the superimposed holes, and comprising an arcuate clamp member rotatably positioned on one of the poles astride the leaf spring and having an inner surface comprised of a first, relatively large diameter segment which, when rotated into radial alignment with the leaf spring, permits withdrawal of the finger from the superimposed holes, and a second, relatively smaller diameter segment which, when rotated into radial alignment with the leaf spring, frictionally engages and clamps the leaf spring to the pole and prevents withdrawal of the finger from the superimposed holes, said clamp member adapted to freely slide along the longitudinal extent of the leaf spring when said relatively large diameter segment of the inner surface thereof is radially aligned with the leaf spring, and wherein said ring is adapted to frictionally engage and clamp the leaf spring to the pole at a point between the finger and the free end of the leaf spring.

2. In a splice joint according to claim 1, wherein said arcuate clamp member comprises a closed ring encircling one of the poles and the leaf spring positioned thereon.

3. In a splice joint according to claim 2, wherein said ring includes gripping means positioned on its outer surface for aiding in the hand rotation thereof.

4. In a splice joint according to claim 3, wherein said gripping means comprises at least one outwardly projecting ear-like member.

5. In a splice joint for releasably joining two poles together end to end, one of the poles having an end portion of a reduced diameter for being matingly positioned in a tubular end portion of the other pole, both poles having a through hole in a radial wall of their respective end portions for being positioned in superimposed relation with each other, and an axially extending leaf spring secured to the outer surface of the end portion of one of the poles and having an inwardly extending finger toward the free end thereof for being positioned under spring tension in the superimposed holes, the combination therewith of locking means for preventing inadvertent withdrawal of the finger from the superimposed holes, and comprising a closed ring rotatably positioned on and encircling one of the poles astride the leaf spring positioned thereon, and having an inner surface comprised of a first, relatively large diameter segment, which when rotated into radial alignment with the leaf spring, permits withdrawal of the finger from the superimposed holes, a second relatively smaller diameter segment, which, when rotated into radial alignment with the leaf spring, frictionally engages and clamps the leaf spring to the pole and prevents withdrawal of the finger from the superimposed holes, said ring being adopted to freely slide along the longitudinal extent of the leaf spring when the relatively large diameter segment of the inner surface thereof is radially aligned with said leaf spring, and gripping means positioned on the outer surface of said ring for aiding in the hand rotation thereof, and wherein said ring is adapted to frictionally engage and clamp the leaf spring to the pole at a point between the finger and the free end of the leaf spring.

6. In a splice joint according to claim 5, wherein said gripping means comprises two diametrically opposed, outwardly projecting ear-like members.

7. In a splice joint according to claim 5, wherein said first, relatively large diameter segment of said ring is integrally formed therein and has substantially the same diametrical width as the leaf spring.

8. A lock for a splice joint of the type utilized for releasably joining two poles together end to end, one of the poles having an end portion of a reduced diameter for being matingly positioned in a tubular end portion of the other pole, both poles having a through hole in a radial wall of their respective end portions for being positioned in superimposed relation with each other, and an axially extending leaf spring secured to the outer surface of one of the poles and having an inwardly extending finger toward the free end thereof for being positioned under spring tension in the superimposed holes, said lock comprising:
  a. An arcuate clamp member for being rotatably positioned on one of the poles astride the leaf spring;
  b. said clamp member having an inner surface comprised of a first, relatively large diameter segment, which, when rotated into radial alignment with the leaf spring is adapted to freely slide along the longitudinal extent of the leaf spring away from said inwardly extending finger in order to permit withdrawal of the finger from the superimposed holes; and
  c. A second, relatively smaller diameter segment which, when rotated into radial alignment with the leaf spring, frictionally engages and clamps the leaf spring to the pole and prevents withdrawal of the finger from the superimposed holes, and wherein said leaf spring is adapted to frictionally engage and clamp the leaf spring to the pole at a point between the finger and the free end of the leaf spring.

9. A lock for a splice joint according to claim 8, wherein said first, relatively large diameter segment of said arcuate clamp member is integrally formed therein and has substantially the same diametrical width as the leaf spring.

10. A lock for a splice joint according to claim 8, wherein said arcuate clamp member comprises a closed ring for encircling one of the poles and the leaf spring positioned thereon.

11. A lock for a splice joint according to claim 10, wherein said ring includes gripping means positioned on its outer surface for aiding in the hand rotation thereof.

12. A lock for a splice joint according to claim 11, wherein said gripping means comprises at least one outwardly projecting ear-like member.

13. A lock for a splice joint according to claim 11, wherein said gripping means comprises two diametrically opposed, outwardly projecting ear-like members.

* * * * *